United States Patent Office.

JAMES OSWALD SWINNEY, OF GLASGOW, MISSOURI, AND A. H. POLLOCK, OF GERMANTOWN, KENTUCKY, ASSIGNEES, BY MESNE ASSIGNMENTS, OF JOSEPH BENOHUE HARRIS.

*Letters Patent No.* 56,044, *dated July* 3, 1866; *reissue No.* 3,640, *dated September* 14, 1869.

IMPROVED COMPOSITION FOR RENDERING PAINTS FIRE-PROOF.

The Schedule referred to in these Letters Patent and making part of the same.

*To all whom it may concern:*

Be it known that JOSEPH B. HARRIS, of Germantown, in the county of Mason, and State of Kentucky, has invented certain new and useful Improvements in Composition for Fire-Proof Paints; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, we will proceed to describe it.

Take the schist or shale that is found in connection with bituminous coal, having but little bitumen in it, and subject it to heat in a retort or kiln till all the bituminous or volatile substance has been expelled, and the residuum has been reduced to a friable or pulverous condition, of a light gray or pearl color. This pulverous residuum is then bolted through a fine bolt, to free it of all hard lumps and gritty particles, and then ground in good boiled linseed-oil with the paint with which it is to be combined.

The quantity requisite to make the paint uninflammable will depend in some degree upon the body or qualities of the paints with which it is combined.

For white and red lead, about the following proportions are used: three parts (in weight) of the calcined schist, shale, or coal, to one part of lead, ground together in good oil, as above described; and for ochres, umbers, &c., four parts of the calcined material to one part of ochre or umber, prepared and ground as aforesaid. For other paints, the proportions should be about the same as last mentioned. No turpentine is used as a drier; but japan or litharge, or driers of a thin nature, should be used.

The ingredient which is thus added to all paints, to render them uninflammable or fire-proof, is, as has been before stated, of a light grey or pearl color, and may be added to any paint, without materially changing its hue; but a finishing-coat may be added without any of this ingredient in it, to give any shade or brilliancy that may be desired.

Wood painted with this mixture will resist the action of flames, sparks, and live coals, so that floors painted with it will not be liable to take fire from the falling of burning coals upon them, and the roofs of buildings will be protected from danger by sparks flying from chimneys, or burning shingles, and other light burning substances, carried by the wind from burning buildings in the vicinity.

The chalky calcined residuum which is used may be produced from most kinds of mineral coal; but the slightly-bituminous schists or shales found in coal-mines are regarded preferable to mineral coal proper.

It is obvious that instead of grinding the material in oil, it may be finely ground dry, and thus kept, so as to be more readily stored a d transported, and then mixed with any paint when desired for use. In this way, the composition itself becomes a new and separate article of manufacture and trade.

Having thus fully described the invention, and the manner of carrying it into effect,

What is claimed as new, and desired to be secured by Letters Patent, is—

1. The herein-described composition or material for mixing with paints, to render them fire-proof, substantially as described.

2. The combination of calcined schist, shale, or mineral coal, prepared as above described, with any kind of oil-paint, to render the same uninflammable or fire-proof, substantially as above set forth.

JAMES OSWALD SWINNEY,
*Assignee of Joseph Benohue Harris.*

Witnesses:
GEO. B. HARRISON,
N. LACKLAND.

A. H. POLLOCK,
*Assignee as to One-Fourth from James O. Swinney.*

Witnesses:
ROBT. A. COCHRAN,
STEPHEN P. ADAMSON.